(No Model.) 2 Sheets—Sheet 1.
P. GIOVANNINI.
GATE OR VALVE.
No. 295,998. Patented Apr. 1, 1884.
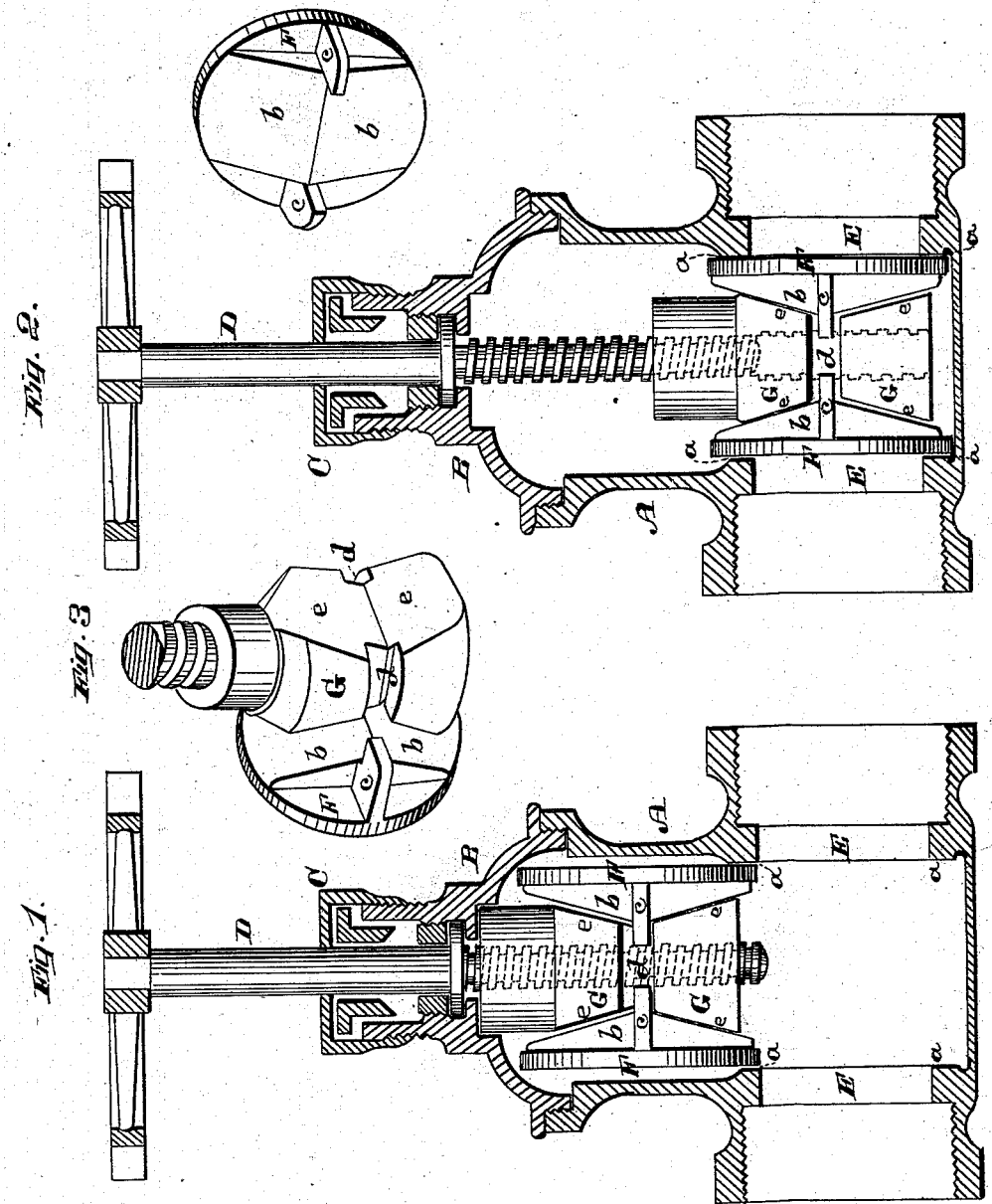
Witnesses
Geo. H. Strong
J. H. Krouse
Inventor
P. Giovannini
By Dewey & Co.
Attorneys (No Model.)  P. GIOVANNINI.  2 Sheets—Sheet 2.
GATE OR VALVE.
No. 295,998.  Patented Apr. 1, 1884.
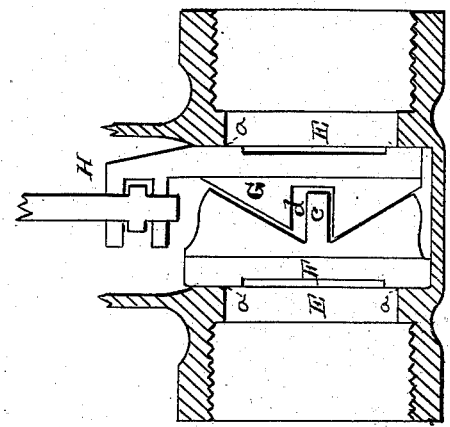
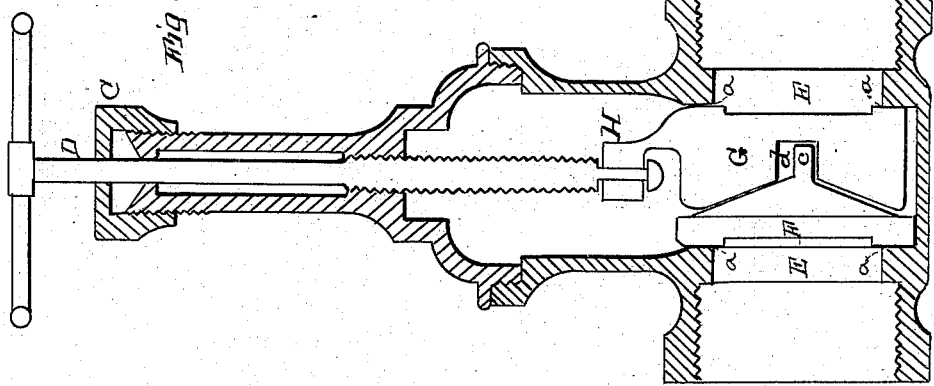

UNITED STATES PATENT OFFICE.

PHILIP GIOVANNINI, OF SAN FRANCISCO, CALIFORNIA.

GATE OR VALVE.

SPECIFICATION forming part of Letters Patent No. 295,998, dated April 1, 1884.

Application filed April 30, 1883. (No model.)

*To all whom it may concern:*

Be it known that I, PHILIP GIOVANNINI, of the city and county of San Francisco, State of California, have invented an Improved Gate or Valve; and I hereby declare the following to be a full, clear, and exact description thereof.

My invention relates to certain improvements in valves of that description known as "straight-way" valves or gates; and it consists of two disks having their outer faces formed to close against corresponding seats in the passage, and having double inclines upon their inner sides, either convex or concave, together with inwardly-projecting lugs, which fit corresponding depressions in a central block. This block has double-inclined surfaces, to correspond with and act upon the inclines of the valves in closing or opening the same, and it is moved by a screw-thread upon the stem or spindle, as will be more fully explained by reference to the accompanying drawings, in which—

Figure 1 is a vertical section through the valve-chamber, valves, and central operating device, showing the valve up. Fig. 2 shows the valve down. Fig. 3 is a perspective view of the valve. Figs. 4 and 5 are modifications of my invention.

A is the chamber or shell of my valve or gate, having the cap B, stuffing-box C, and the valve-stem D, with the hand-wheel or other means for turning it.

E E are the steam or water ways, passing in line through the lower part of the chamber at right angles with the stem D, and having flat seats $a$ $a$ at their inner ends.

The valves F F are in the form of flat disks, having their outer faces turned and ground to fit the seats $a$ of the passages E, while their inner sides or backs have inclined faces $b$ $b$, which extend from a central point to the top and bottom of the disks. These meeting inclines may form either a convex or a concave, as shown in the drawings, and according to the shape given to the central block, G, by which they are operated. Upon each side of the inclines $b$ are projecting lugs $c$, which enter slots $d$, made for them in the central block. This block G has inclined faces $e$, corresponding with the faces $b$ of the valves, and has a hole with screw-threads extending through it to receive the screw which is cut upon the stem D. This stem has in some cases a groove or collar, which prevents its being advanced when turned, and the screw thread upon it will thus move the block G up and down. As shown in Fig. 4, the stem has a head on its lower end, which enters a groove, with a neck or collar on the valve, and the screw-stem is moved up or down, carrying the valve with it. The valves F are moved up or down by the lugs $c$, which project horizontally into the slots $d$, made in the block G upon each side of the inclined faces, and they have no pressure upon the seats $a$, because the lugs $c$ are supported upon the bottoms of the slots $d$, so that the inclined faces will not act upon the corresponding faces of the valves while they are being drawn up and opened. When the screw is turned in the opposite direction, the valves sink to their places by gravitation, the lugs $c$ resting upon the bottom of the slots $d$ until the valves have reached their seats. Upon being still farther depressed the inclined faces of the block begin to press upon the corresponding inclines of the valves, thus forcing them closely against their seats. The slots $d$ are made deep enough vertically to allow the block to continue its descent without the upper sides of the slots striking the lugs $c$, these latter only serving as a means for lifting the valves without pressing them outward. By this construction the valves are moved easily in each direction to open or close them, and no pressure is brought upon them to force them outward until they reach the bottom and are opposite their seats. In the same manner they are released from this outward pressure before they are moved upward, and are lifted by the lugs $c$ without pressure in either direction. These disks may be reversed and put in either side up, or upon either side of the central block, so that any tendency to wear more upon one side than the other will be corrected.

It will be seen that the inclines upon the backs of the valves may meet, so as to form a convex surface, while the corresponding faces of the block G may form a concave; or the valve-inclines may be concave and those upon the block convex. The lugs $c$ and the slots $d$ will be the same in either case. The same result will be produced by making the inclined faces of one valve convex and those upon the other concave, the thickness being such that the two will fit together without any interme-
diate block. One of the valves will then have the slots d formed in it, and the other will have the corresponding lugs, c. In this case an arm, H, is carried upward from one valve, and is turned so as to have its end, which is slotted, stand above the center of the space between the valve-faces. When made in this way, a head is formed upon the lower end of the valve-stem, and this is slipped in below the arm, its neck fitting the slot therein, so that the valves may be moved by the movement of the valve-stem, which, in this case, turns through a stationary nut, and itself moves up and down when turned.

I am aware that a valve or gate made with two independent disks, having upon their inner faces inclines, in connection with an intermediate mechanism, consisting of a suitable frame, swiveled or otherwise connected to the valve-stem, and provided on its upper half with an inclined projection or wedge, and having upon its lower half a loosely-fitting wedge, is old, and such I do not wish to be understood as claiming, broadly, as of my invention; nor do I wish to be understood as claiming, broadly, anything shown, described, or claimed in patent granted to myself and B. Bennerscheidt, numbered 209,882, and dated November 12, 1878.

Having thus described my invention, what I claim as new, and desire to secure by Letters Patent, is—

The combination, with the stem D, mounted in the casing A B C, and carrying upon its screw-threaded lower portion the block G, formed with the reversely-inclined faces e e, and grooves d, of the disks F, provided at their inner sides with the reversely-inclined faces b, for engaging with the said inclined faces e, and with the lugs c, for entering the said grooves d, substantially as and for the purposes set forth.

In witness whereof I hereunto set my hand.

PHILIP GIOVANNINI.

Witnesses:
O. M. THARP,
JAMES MASON.